United States Patent [19]

Miremadi et al.

[11] Patent Number: 5,279,805
[45] Date of Patent: Jan. 18, 1994

[54] GAS STORAGE USING TRANSITION METAL DICHALCOGENIDES

[75] Inventors: Bijan K. Miremadi, Coquitlam; Stanley R. Morrison, Burnaby; Konrad Colbow, West Vancouver, all of Canada

[73] Assignee: 410261 B.C. Ltd., West Vancouver, Canada

[21] Appl. No.: 880,203

[22] Filed: May 6, 1992

[51] Int. Cl.$^5$ ............................................... B01J 8/02
[52] U.S. Cl. ................................. 423/245.1; 423/248; 48/197 R; 585/899; 585/850
[58] Field of Search ................... 423/245.1, 248, 509, 423/561.1; 48/197 R; 585/899, 850

[56] References Cited

U.S. PATENT DOCUMENTS

| | | | |
|---|---|---|---|
| 4,822,590 | 4/1989 | Morrison et al. | 423/561.1 |
| 4,853,359 | 8/1989 | Morrison et al. | 502/220 |
| 4,902,579 | 9/1988 | Grasselli et al. | 428/610 |
| 4,915,898 | 4/1990 | Wolff et al. | 419/3 |
| 4,923,770 | 5/1990 | Grasselli et al. | 429/101 |
| 4,946,646 | 8/1990 | Gamo et al. | 420/415 |
| 4,948,423 | 8/1990 | Fetcenko et al. | 75/10.14 |
| 4,996,108 | 2/1991 | Divigalpitiya et al. | 428/411.1 |
| 5,002,730 | 3/1991 | Fetcenko | 420/424 |
| 5,006,328 | 4/1991 | Hong | 423/644 |
| 5,028,389 | 7/1991 | Lee et al. | 420/422 |

FOREIGN PATENT DOCUMENTS 50-115691 9/1975 Japan ................... 423/248

OTHER PUBLICATIONS

Sakai et al, Metal Hydride Anodes for Nickel-Hydrogen Secondary Battery, Mar., 1990, J. Electrochem. Soc. vol. 137, No. 3, 795-799.
Imamura et al, Improved Hydrogen Storage by Mg and Mg-Ni Modified by Organic Compounds, Journal of the Less Common Metals, 172-174 (1991) 1064-1070.
Miremadi et al, New Structures from Exfoliated MoS2, J. Appl. Phys. 69(9), May, 1991, 6273-6379.
Fujii et al, New Composite Materials for Hydrogen Storage using Magnesium as a Binder, Journal of the Less-Common Metals, 175(1991) 243-257.
Murray et al, The Thermodynamics of the LaNi$_5$-H$_2$ System by Differential Heat Flow Calorimetry I: Techniques, The $\alpha+\beta$ Two-Phase Region, Journal of the Less-Common Metals, 80 (1981) 201-209.
Post et al, Metal Hydride Studies at the National Research Council of Canada, Int. J. Hydrogen Energy, vol. 9, No. 1/2, pp. 137/145, 1984.
U.S. application Ser. No. 07/704,432 May 1991.

*Primary Examiner*—Gregory A. Heller
*Assistant Examiner*—Stuart L. Hendrickson
*Attorney, Agent, or Firm*—Norman M. Cameron

[57] ABSTRACT

Hydrogen and gaseous hydrocarbons are stored by introducing the gases into a transition metal dichalcogenide having the formula $MX_2$. M is selected from the group consisting of Mo, W and Ti and X is selected from the group consisting of S and Se. The $MX_2$ is in the form of platelets affixed to basal planes of adjacent platelets. The basal planes of adjacent platelets are separated by voids. The composition is prepared by intercalating $MX_2$ powder with lithium, adding water to separate the $MX_2$ into single layers and then adding acid to adjust the pH to a range where edges and basal planes of the single layers have opposite charges. Preferably a catalyst is added to the $MX_2$, the catalyst being selected from the group of metals consisting of Pt, Pd, Ni, Co, Fe, Mg, Zr, Cr, Al, Zn, Mn or combinations thereof. The gas can be recovered from the composition by heating to a temperature of 250° C. when the catalyst is used.

10 Claims, 1 Drawing Sheet

GAS STORAGE USING TRANSITION METAL DICHALCOGENIDES

BACKGROUND OF THE INVENTION

1. Field of the Invention

This invention relates to compositions of transition metal dichalcogenides for storing hydrogen and gaseous hydrocarbons and methods for preparation thereof.

2. Description of Related Art

There has been intense interest and considerable research activity directed to ways for storing hydrogen gas other than the conventional manner as a highly compressed gas. The cylinders used to store the compressed gas are heavy, costly and potentially dangerous because of the high pressure of flammable gas they contain. One reason for the great activity in pursuing a better storage system is the potential use of hydrogen as an ecologically sound substitute for gasoline as a vehicle fuel. Prototype vehicles burning hydrogen fuel have already been produced, but one of the factors delaying production is the lack of an acceptable storage means. Preferably, the storage means should also be suitable for gaseous hydrocarbons as well.

Materials have been developed which aid in storing such gases at relatively low pressures. Desirable characteristics of suitable materials include (a) the ability to adsorb or absorb large quantities of the gas in a minimum volume, (b) provision for easy access of the gases to the adsorption or absorption sites, and (c) easy reversibility so that the gas can be reclaimed from the storage material easily and conveniently.

One approach has been to use materials which form hydrides which are easily decomposed. See, for example, U.S. Pat. No. 4,948,423 and 5,002,730 to Fetcenko as well as U.S. Pat. No. 4,946,646, 4,923,770, 4,915,898 and 5,006,328. Examples of such materials are $LaNi_5$, $CaNi_5$, FeTi, $Mg_{2.4}Ni$ and $CoNi_5$. These materials absorb hydrogen, allowing large quantities of the gas to be stored. Each of the above compositions covers a certain range of pressure and temperature. For example, $LaNi_5$ performs well between 1-2 atm at 20° C., forming the hydride of $LaNi_5H_6$. $CaNi_5$ is a low pressure hydride, below 0.5 atm. FeTi operates at 10 atmospheres and $Mg_{24}Ni$ works at high pressures of 10 atm and at high temperatures—more than 300° C. The gas is reclaimed by heating the cylinder or other container.

Many of such materials do not provide satisfactory storage and release of the gas. There is simply no way in which the gas has access to the interior of such materials to react therewith. In order to provide pores through which the gas can move to and from the absorption sites, the absorbent is typically supported by a material, such as alumina particles, that have no role in the absorption process as such, and take up valuable space as well as adding weight. The alumina particles are typically pelletized into small pellets of approximately 1 $cm^3$, to permit gas movement. The gas can move between the pellets freely, and with the small pellets can enter the pores of the pressed alumina and reach the absorbent.

The production of single molecular thickness layers of $MoS_2$ and other transition metal dichalcogenides is disclosed in U.S. Pat. No. 4,822,590 to S. Roy Morrison et al. The $MoS_2$ is exfoliated into monolayers by intercalation with lithium followed by reaction with water. The reaction between the water and the lithium forces the layers of $MoS_2$ apart into one-molecule-thick platelets. Flocculation occurred rapidly when the pH was reduced to a value of 3 or less.

U.S. Pat. No. 4,996,108 to Divigalpitya et al. carries this process further by forming a suspension of a transition metal dichalcogenide in water and adding to the suspension a liquid which is immiscible with water. The mixture is agitated, then allowed to rest. A sheet-like composition of about 500 Å to 750 Å forms at the interface of the water and the immiscible liquid.

In U.S. Pat. No. 4,853,359 to Morrison et al., a novel flocculated, supporting single-layered transition metal dichalcogenide catalyst is disclosed. The patent discloses that if the pH is maintained at a value about 3, the suspension of $MoS_2$ will not flocculate, but will stay four days or more suspended in water. The next step in producing the catalyst according to the patent is to add a catalytic promoter to the suspension. A solid is formed by adding this promoter or support substance to the water. The flocculated solid is then separated from the liquid.

In an Article, J. Appl. Phys. 69(9) 6373 (1991) by Miremadi et al., the deposition of thick oriented films of a transition metal dichalcogenide, with a thickness in the order of 0.1 to 10 microns, is disclosed.

In pending U.S. patent application No. 07/704,432, a novel transition metal dichalcogenide with a house-of-cards (HOC) structure is disclosed and method for production thereof. The method involves reducing the pH of a suspension of single molecular thickness platelets of $MoS_2$, or other transition metal dichalcogenides, until they flocculate, and the pH is within a range between a first pH where basal planes of the platelets have a zero charge and a second pH where edges of the platelets have a zero charge.

SUMMARY OF THE INVENTION

It is an object of the invention to provide an improved hydrogen storage medium wherein the absorbent is effective by itself without the addition of large quantities of inert materials, such as alumina pellets.

It is also an object of the invention to provide a storage medium for hydrogen and other gases, wherein the gas can be recovered relatively easily, for example by heating the medium to a relatively low temperature.

It is a further object of the invention to provide a storage medium for hydrogen and other gases, which is capable of storing relatively large quantities of gas at a low pressure with a relatively small volume and weight of the storage medium.

In accordance with these objects, one aspect of the invention provides a method for storing a gas selected from the group consisting of hydrogen and gaseous hydrocarbons. The method comprises introducing the gas into a transition metal dichalcogenide having the formula $MX_2$. M is selected from the group consisting of Mo, W and Ti and X is selected from the group consisting of S and Se. The $MX_2$ is in the form of platelets which have edges affixed to basal planes of adjacent platelets, and wherein the basal planes of adjacent platelets are separated by voids. The gas may be recovered by heating the $MX_2$ to about 250° C.

Preferably, the $MX_2$ is coated with a catalyst selected from the group consisting of Pt, Pd, Ni, Co, Fe, Mg, Zr, Cr, Al, Zn, Mn or combinations thereof.

Another aspect of the invention provides a composition having the formula $Y\text{-}MX_2$, $MX_2$ is in the form of platelets having edges affixed to basal planes of adjacent said platelets with basal planes of adjacent platelets being separated by voids. The M is selected from the group consisting of Mo, W and Ti. X is selected from the group consisting of S and Se. The $MX_2$ is coated with Y which is selected from the group consisting of Pt, Pd, Ni, Co, Fe, Mg, Zr, Cr, Al, Zn, Mn or combinations thereof.

A further aspect of the invention provides a method for producing a hydrogen gas storage medium. $MX_2$ is intercalated with lithium. M is selected from the group consisting of Mo, W and Ti. X is selected from the group consisting of S and Se. Water is added to the lithium intercalated $MX_2$ to separate the $MX_2$ into single layers. An acid is added to the single-layered $MX_2$ to adjust the pH to a pH in the range where edges and basal planes of the single layers have opposite charges. A cataylst is added to the $MX_2$ which is selected from the group consisting of Pt, Pd, Ni, Co, Fe, Mg, Zr, Cr, Al, Zn, Mn or combinations thereof. Preferably, the $MX_2$ is heated in hydrogen to 400° C. after the pH is adjusted.

BRIEF DESCRIPTION OF THE DRAWING

The drawing is a graph showing a plot of pressure-composition isotherms for hydrogen desorption for various materials.

DESCRIPTION OF THE PREFERRED EMBODIMENTS

Figure 1:
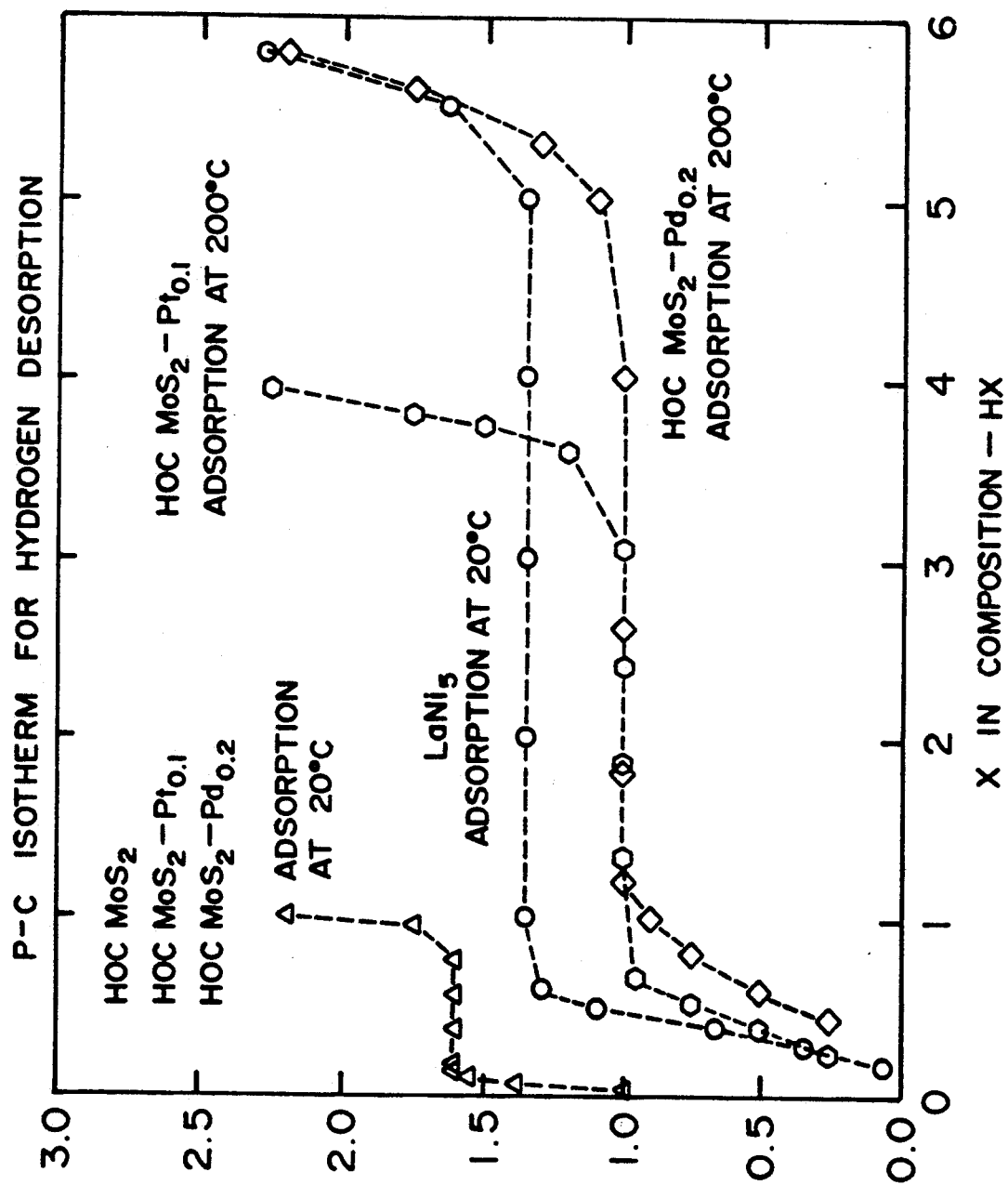

The preferred basic material used for the storage of hydrogen or the other gases according to the invention is $MoS_2$ which is prepared with the House of Cards (HOC) structure. Lithium is intercalated into powdered $MoS_2$. The powder is immersed in water to generate hydrogen, separating the layered compound into single layers. Next, the pH is lowered in a controlled way to pH=2.0. This is the point of zero charge for $MoS_2$ where the HOC structure is formed. The pH is 2 for $MoS_2$. The applicable pH varies if other transition metal dichalcogenides are substituted.

The $MoS_2$ is heated in hydrogen at 400° C. to stabilize the HOC structure, presumably causing a reaction at the contacting points between the edges and basal planes of adjacent platelets. The open structure has all the desirable characteristics for storage of the hydrogen or other gases, assuming that the gases can be absorbed by the $MoS_2$ in large quantities at low temperature and also removed at low temperature. These requirements have been established by the present invention.

The HOC $MoS_2$ itself has been found to be effective for storing hydrogen and other gases. This is due to the structure which is characterised by single layers of $MoS_2$ stacked in a particularly open structure. The layers are about 6 Å thick and about 1000 Å in diameter. It was found that by cycling the temperature, hydrogen adsorbs on the HOC $MoS_2$ in an amount equivalent to a high pressure storage tank at 1000 psi. In other words, a tank filled with HOC $MoS_2$ would hold the same amount of gas at atmospheric pressure as the same tank would hold at 1000 psi without the $MoS_2$. The gas was removed from the $MoS_2$ by heating the adsorbent to 250° C.

However, further efforts were made to produce an improved adsorbent which would not require such a high temperature cycle. Various metals, including nobel metals are known to catalyze the dissociation of the hydrogen or gaseous organic. Thus, a catalyst was introduced into the HOC $MoS_2$ to help dissociate the $H_2$ at room temperature. The catalyst may be Pt, Pd, Ni, Co, Fe, Mg, Zr, Cr, Al, Zn, Mn or combinations thereof.

With $MoS_2$ untreated with a catalyst, the adsorption at room temperature corresponded to the gas stored in a pressure tank at 20 psi. However, with 0.1 atomic % Pt to Mo in HOC $MoS_2$, the amount stored corresponded to the gas stored at a pressure of 40 psi. It was found that the gas can be added or removed in about ten minutes.

The HOC $MoS_2$ may also be used as a support for the standard "hydrideforming" materials used for storage, including $LaNi_5$, $CdNi_5$, $CaNi_5$, FeTi, $CoNi_5$ and $Mg_{2.4}.Ni$. The use of HOC $MoS_2$ as a support is preferred over alumina, because the support itself is highly active in helping to store the gas and is of the open structure needed for rapid gas adsorption and removal without requiring pellets or the like.

The materials, HOC $MoS_2$-H, HOC $MoS_2$-$Pt_{0.1}$-H and HOC $MoS_2$-$Pd_{0.2}$-H all perform at room temperature and 1.5 atm as one-hydrogen hydrides. In other words, the Pd and the Pt have no effect except to catalyze the dissociation of the hydrogen. Approximately one hydrogen per molecule of $MoS_2$ is absorbed. At elevated temperature however, specifically 200° C., higher hydrides are formed as in Table 1:

TABLE 1

| Formula | Material | H Absorbed per Molecule |
|---|---|---|
| A | HOC $MoS_2$ | $H_2$ |
| B | HOC $MoS_2$—$Pt_{0.1}$ | $H_4$ |
| C | HOC $MoS_2$—$Pd_{0.2}$ | $H_6$ |

FIG. 1 shows a plot of pressure-composition isotherms for hydrogen desorption. The number of hydrogen atoms is represented by x. For example for formulas A, B, and C at room temperature and 1.5 atm, x=1. At 200° C. and 1 atmosphere, x=4 for B, and at 200° C. and at 1 atm, x=6 for C, as indicated in Table 1. For comparison the pressure/composition isotherm for $LaNi_5$ is also presented. This is a high purity material specifically prepared for hydrogen storage material obtained from Alpha products, Johnson Mathers Inc. It is observed for this material that x=6 at room temperature and 1.3 atm. The plot of data for Formula A is not shown in the graph. At 200° C. and 1 atm., x=2 for this material.

To compare the materials described in this invention with those currently available, it should be noted that the adsorption/desorption process is much easier with materials according to the invention than, for example, with $LaNi_5$, $CaNi_5$ or FeTi. With the HOC materials, hydrogen adsorbed at 20° C. shows a desorption peak at 70° C., while hydrogen adsorbed at 200° C. shows a desorption peak at 270° C. By comparison, for $LaNi_5$, $CaNi_5$ or FeTi, all desorption peaks are above 300° C., even when the adsorption is done at room temperature.

EXAMPLE 1

$MoS_2$ obtained from MRC Inc., was immersed in n-butyllithium dissolved in hexane. The suspension was stored in a dry box for more than 24 hours to intercalate the $MoS_2$ with lithium. The lithiated powder was washed with hexane and dried in a dry box. The powder was immersed in water for the $Li/H_2O$ reaction and hydrogen was seen to evolve. The single layers formed were in a suspension in a LiOH solution. The single layers were washed to remove the excess lithium and introduced slowly into a pH 2.0 solution of $HNO_3$. The material flocculated in a form recognizable as the HOC structure by the absence of a (002) x-ray diffraction line, indicating no contact between the basal planes.

The HOC $MoS_2$ was dried at room temperature, then the HOC $MoS_2$ was inserted into a pumpable system and hydrogen was admitted at a pressure of 1 atmosphere. The temperature was cycled to 225° C. and then back to room temperature. The excess hydrogen was pumped off, and the sample was heated to evolve the remaining adsorbed hydrogen. The hydrogen was then desorbed by a temperature-program desorption (TPD) cycle, reaching a temperature of 250° C. It was found that the amount adsorbed was $6.5 \times 10^{-3}$ moles/g. By calculation, it may be shown that this corresponds to 2000 psi equivalent.

EXAMPLE 2

A 100 mg sample of the HOC $MoS_2$ powder as described in Example 1 was placed in a test tube. 0.1 g of $PtCl_4$ in HCl, having a volume of about 0.15 cc, was introduced into the test tube to prepare a slurry, which was stirred for uniformity. The slurry was dried in air at room temperature. The sample was heated to 400° C. in a vacuum for 60 minutes and then cooled to room temperature. The sample, as described Example 1 was exposed to one atm of hydrogen at 20° C. The system was pumped out quickly, the pump closed off, and the gas adsorbed was measured by TPD. With hydrogen adsorption at room temperature, the hydrogen release peaked at 125° C. with the total released hydrogen being measured at $3.1 \times 10^{-3}$ moles/g or 3 moles H/Kg $MoS_2$ or 6.2 g H/6.25×FW ($MoS_2=160$). Therefore 1H atom per FW (Formula Weight) $MoS_2$ is desorbed, viz. $MoS_2$-H.

EXAMPLE 3

A 100 mg sample of HOC $MoS_2$ powder was prepared as described in Example 1. The powder was inserted into a pumpable container and the gases evacuated. The container was sealed and immersed in a solution containing the additive of interest, Pd in this example. The seal was opened and the solution impregnated the evacuated pores of the $MoS_2$. The process yielded a much more even distribution of metal in the pores of the HOC $MoS_2$.

What is claimed is:

1. A method for storing and recovering a gas selected from the group consisting of hydrogen and gaseous hydrocarbons, the method comprising:
    adsorbing or absorbing the gas with a transition metal dichalcogenide having the formula:

$MX_2$ wherein M is selected from the group consisting of Mo, W and Ti and X is selected from the group consisting of S and Se, the $MX_2$ being in the form of platelets which have edges affixed to basal planes of adjacent platelets and wherein the basal planes of adjacent platelets are separated by voids, the $MX_2$ contacting a catalyst selected from the group consisting of Pt, Pd, Ni, Co, Fe, Mg, Zr, Cr, Al, Zn, Mn and mixtures and salts thereof; and
    recovering the gas by heating the $MX_2$ to 125° C., the catalyst catalyzing the recovery of the gas.

2. A method as claimed in claim 1, wherein the platelets have a single molecule thickness.

3. A method as claimed in claim 1, wherein the platelets are 6 Å thick.

4. A method as claimed in claim 1, wherein the catalyst is in the form of a salt.

5. A method as claimed in claim 1, wherein the $MX_2$ is coated with a hydrogen absorbent selected from the group consisting of La, Ni, Fe, Ti, Mg, Co, and compounds thereof apart from said $MX_2$.

6. A method as claimed in claim 1, wherein the $MX_2$ is treated with a hydrogen absorbent selected from the group consisting of $LaNi_5$, $CaNi_5$, FeTi, $Mg_{24}.Ni$ and $CoNi_5$.

7. A method as claimed in claim 1, wherein the $MX_2$ is a powder.

8. A method for storing and recovering a gas selected from the group consisting of hydrogen and gaseous hydrocarbons, the method comprising:
    adsorbing or absorbing the gas with a transition metal dichalcogenide having the formula:

$MX_2$ wherein
    M is selected from the group consisting of Mo, W and Ti and X is selected from the group consisting of S and Se, the $MX_2$ being in the form of platelets which have edges affixed to basal planes of adjacent platelets and wherein the basal planes of adjacent platelets are separated by voids; and
    recovering the gas by heating the $MX_2$ to 250° C.

9. A method as claimed in claim 8, wherein the $MX_2$ is coated with a hydrogen absorbent selected from the group consisting of La, Ni, Fe, Ti, Mg, Co, and compounds thereof apart from said $MX_2$.

10. A method as claimed in claim 8, wherein the $MX_2$ is coated with a hydrogen absorbent selected from the group consisting of $LaNi_5$, $CaNi_5$, FeTi, $Mg_{2.4}.Ni$ and $CoNi_5$.

* * * * *